United States Patent [19]

Numakura

[11] 4,208,673
[45] Jun. 17, 1980

[54] COLOR RECORDER FOR REDUCING CROSSTALK

[75] Inventor: Toshihiko Numakura, Kamakura, Japan

[73] Assignee: Sony Corporation, Tokyo, Japan

[21] Appl. No.: 815,012

[22] Filed: Jul. 12, 1977

[30] Foreign Application Priority Data

Jul. 14, 1976 [JP] Japan .................. 51-83660

[51] Int. Cl.$^2$ .......................... H04N 5/78; H04N 5/79
[52] U.S. Cl. ......................................... 358/8; 358/4; 360/33
[58] Field of Search ...................... 360/34, 33, 25, 26, 360/27, 28, 30, 9; 358/127, 4, 8

[56] References Cited

U.S. PATENT DOCUMENTS

| | | | |
|---|---|---|---|
| 3,403,231 | 9/1968 | Slaton | 360/34 |
| 3,893,168 | 7/1975 | Bechly | 360/33 |
| 3,918,085 | 11/1975 | Numakura | 360/33 |
| 4,007,484 | 2/1977 | Amari | 358/8 |
| 4,131,912 | 12/1978 | Hirai | 358/127 |

OTHER PUBLICATIONS

*Video Tape Recording*, by J. L. Berstein, © 1960, by John F. Rider Publisher, Inc., pp. 140–141.

*Primary Examiner*—James W. Moffitt
*Assistant Examiner*—Alan Faber
*Attorney, Agent, or Firm*—Lewis H. Eslinger; Alvin Sinderbrand

[57] ABSTRACT

A method of and apparatus for recording a video signal in successive parallel tracks on a record medium, and for reproducing the recorded signal. The video signal, which may be the luminance component of a composite color television signal, frequency modulates a carrier to produce a frequency modulated video signal. The phase of the frequency modulated video signal is selectively shifted in selected line intervals and is recorded in parallel tracks such that the phase difference between frequency modulated video signals in at least some adjacently recorded line intervals of successive tracks is an odd multiple of $\pi$. In one embodiment, the difference between the phase of alternate line intervals which are recorded in one track and the phase of alternate line intervals which are recorded in the next adjacent track is equal to an odd multiple of $\pi$. In accordance with another embodiment, the difference between the phases of successive line intervals which are recorded in the same track is equal to an odd multiple of $\pi$. During reproducing, the successive tracks are scanned and the frequency modulated signals recorded therein are reproduced together with a crosstalk component which is picked up by the transducer from an adjacent track, the crosstalk components being out of phase with each other. The reproduced frequency modulated signal is demodulated so as to recover the original video signal and an additional component, the latter being due to the phase shifting of the frequency modulated signal. The additional component then is eliminated from the recorded video signal.

69 Claims, 10 Drawing Figures

COLOR RECORDER FOR REDUCING CROSSTALK

BACKGROUND OF THE INVENTION

This invention relates to a method of and apparatus for recording and/or reproducing video signals on a record medium and, more particularly, to a method and apparatus for recording video signals with a high recording density and for reproducing such signals with minimal interference in the displayed video picture due to crosstalk picked up from adjacent tracks when a particular track is reproduced.

In a typical video recording system, such as a video tape recorder (VTR), a video signal is recorded on a magnetic medium, such as magnetic tape, in successive, parallel, skewed tracks, each track generally having a field interval recorded therein and being formed of successive areas which correspond to respective line intervals of the video signal. If the video signal is a composite color television signal, recording is carried out by separating the chrominance and luminance components, frequency modulating the luminance component to a relatively higher band of frequencies, frequency converting the chrominance component to a band of frequencies which is lower than that contained in the frequency-modulated luminance signal, combining the frequency-modulated luminance signal and frequency-converted chrominance signal and recording the combined signal in the same track. In order to avoid interference due to crosstalk during a signal reproduction operation, that is, to avoid interference due to signals which are picked up by a scanning transducer from an adjacent track when a given track is scanned, it has been the practice heretofore of providing guard bands to separate successive parallel tracks on the record medium. Such guard bands essentially are "empty" of information so as to avoid crosstalk pickup from such adjacent guard bands when a particular track is scanned.

However, the use of guard bands to separate successive tracks is a relatively inefficient usage of the record medium. That is, if the guard bands themselves could be provided with useful information, the overall recording density would be improved. Such improvement can be attained to some degree by providing two transducers for recording the combined luminance and chrominance signals, the two transducers having different azimuth angles. Hence, information is recorded in one track at one azimuth angle and information is recorded in the next adjacent track with a different azimuth angle. When the information in such tracks is reproduced by the same, respective transducers, the information recorded in the scanned track is reproduced with minimal attenuation, but because of azimuth loss, the crosstalk which is picked up from the next adjacent track is substantially attenuated. Since azimuth loss is proportional to the frequency of the recorded signals, it may be appreciated that the crosstalk due to the frequency-modulated luminance signals included in the recorded color television signals is far more attenuated than the crosstalk due to the frequency-converted chrominance signals. Also, since crosstalk attenuation due to azimuth loss is less effective as the width of the parallel tracks is reduced, it is not sufficient to rely solely on the use of transducers having different azimuth angles in order to reduce crosstalk noise when video signals are recorded in very narrow, or overlapped tracks. If the crosstalk picked up from an adjacent track is not attenuated adequately, an interference or beat signal, having a frequency different from either the information signals which are recorded in the scanned track or the picked up signals which are recorded in an adjacent track, will appear as a beat or moire pattern in the video picture which ultimately is displayed.

Since reliance upon azimuth loss is not completely adequate for minimizing crosstalk interference caused by the frequency-converted chrominance signals which are picked up from an adjacent track, it has been proposed that such crosstalk can be reduced substantially by recording the frequency-converted chrominance signals in adjacent tracks with different carriers. For example, the phase of the frequency-converted chrominance carrier can be constant throughout successive line intervals in one track but will shift by 180° from line-to-line in the next adjacent track. An another example, the phase of the frequency-converted chrominance carrier in alternate line intervals in one track will differ by 180° (or $\pi$) from the phase of the frequency-converted chrominance carrier in adjacent alternate line intervals in an adjacent track, while all of the remaining line intervals in adjacent tracks will have frequency-converted chrominance carriers which are in phase with each other. Because of these phase characteristics in both examples, the crosstalk interference due to the frequency-converted chrominance signals which are picked up from an adjacent track will exhibit a frequency interleaved relationship with respect to the frequency-converted chrominance signals which are reproduced from the scanned track. Suitable filtering techniques can be used to eliminate those frequency components which correspond to the crosstalk interference.

While the use of different frequency-converted chrominance carriers is an effective technique for minimizing crosstalk interference attributed to the chrominance signals, there still will be crosstalk interference due to the frequency-modulated luminance signals, particularly if the record tracks exhibit minimal width. One proposed solution to this problem is disclosed and claimed in copending application Ser. No. 770,315 filed Feb. 18, 1977, now U.S. Pat. No. 4,165,518 wherein different carriers for the frequency-modulated luminance signal are recorded in adjacent tracks. This is carried out by using two different bias voltages superposed onto the luminance signal prior to frequency modulation thereof, which bias voltages effectively determine the frequency of a frequency-modulated carrier. As one example of this proposed solution, the frequencies of the carriers differ from each other by an odd multiple of one-half the horizontal synchronizing frequency. In a signal reproduction operation, the reproduced frequency-modulated luminance signal is demodulated, and the bias voltages which had been added to the original luminance signal are removed therefrom, as by subtracting locally-generated bias voltages from the recovered luminance signal. When the reproduced signals are displayed, as on a cathode ray tube, crosstalk interference will be present in successive lines, but such interference will be phase-inverted from line-to-line. Hence, this crosstalk interference will cancel visually and will not be perceived by a viewer.

OBJECTS OF THE INVENTION

It is an object of the present invention to provide an improved method of and apparatus for recording a video signal on a record medium with relatively high density wherein interference due to crosstalk picked up during a reproducing operation will be minimized.

It is another object of this invention to provide a method of and apparatus for recording a frequency-modulated video signal component in relatively narrow, adjacent parallel tracks on a record medium with a particular phase relationship so as to minimize crosstalk interference in the event that the frequency-modulated component in an adjacent track is picked up by a transducer when that transducer scans a given track.

A further object of this invention is to provide an improved method of and apparatus for recording a composite color television signal in relatively narrow, successive parallel tracks on a record medium wherein crosstalk interference due to both luminance and chrominance components which are picked up during a signal reproducing operation is minimized.

Various other objects, advantages and features of this invention will become readily apparent from the ensuing detailed description, and the novel features will be particularly pointed out in the appended claims.

SUMMARY OF THE INVENTION

In accordance with the present invention, an information signal component, such as a video signal component, is recorded in successive parallel tracks on a record medium, the information signal component occurring in successive first time intervals, such as line intervals, which are included in repetitive second time intervals, such as field intervals, each track being formed of successive areas corresponding to the first time intervals. The information signal component is frequency modulated and then selectively phase shifted so that the phase of the frequency-modulated information signal recorded in a predetermined area differs from the phase of the frequency-modulated information signal recorded in an adjacent area by an odd multiple of $\pi$. These adjacent areas are, in one embodiment, successive areas in a given track; and in another embodiment, are in adjacent tracks. In a signal reproducing operation, the recorded signals are reproduced such that the frequency-modulated information signal recorded in each track together with a crosstalk component picked up from an adjacent track are recovered, the crosstalk components being out of phase with each other. The frequency-modulated information signal is demodulated to recover the original information signal component and an additional component due to the phase-shifting of the frequency-modulated signal. This additional component is eliminated from the recovered information signal component.

BRIEF DESCRIPTION OF THE DRAWINGS

The following detailed description, given by way of example, will best be understood in conjunction with the accompanying drawings in which:

FIG. 5, including 5A–5D, is a waveform diagram which is useful in explaining the operation of the apparatus shown in FIG. 4;

DETAILED DESCRIPTION OF CERTAIN PREFERRED EMBODIMENTS

Figures 1, 2, 3:
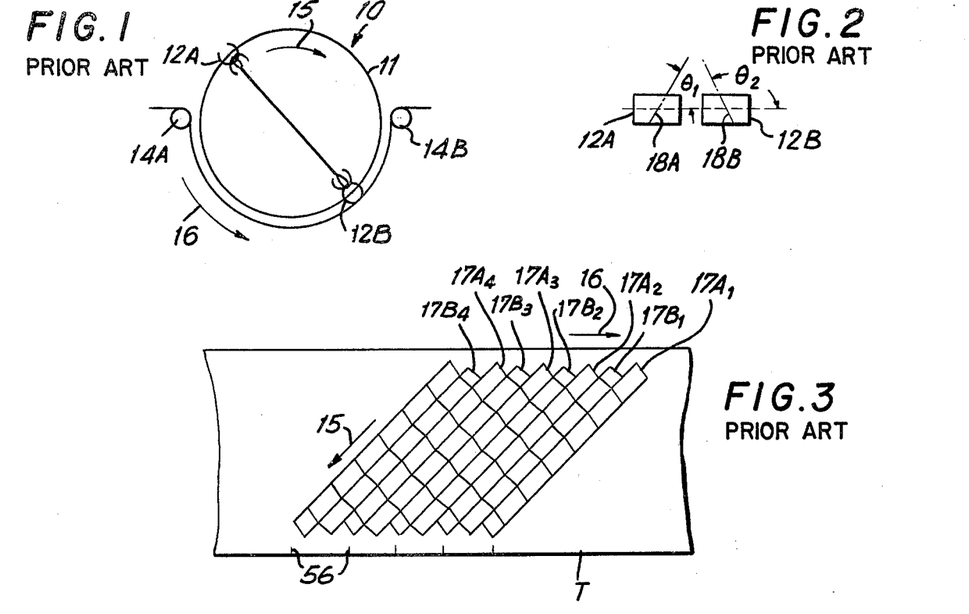
FIG. 1 is a schematic view of a typical rotary head assembly for a video signal recording apparatus.
FIG. 2 is a schematic illustration of the different azimuth angles provided in the recording heads of the assembly shown in FIG. 1.
FIG. 3 is a schematic view of a portion of the record medium upon which the video signals are recorded in successive parallel tracks.

Referring now to the drawings, wherein like reference numerals are used throughout, and initially to FIG. 1, a rotary head assembly 10 is used to record video signals on and reproduce such signals from a magnetic tape T, the assembly including a guide drum 11 having a circumferential slot, and a pair of diametrically opposed rotary transducers or heads 12A and 12B mounted at opposite ends of a suitable support so as to move in a circular path along the circumferential slot of drum 11. The magnetic tape T is suitably guided, as by guide rollers 14A and 14B, in a helical path extending about a substantial portion of the periphery of drum 11. Thus, when the heads are rotated in the direction of the arrow 15 and, simultaneously, tape T is suitably driven in the longitudinal direction indicated by the arrow 16, heads 12A and 12B alternately scan successive parallel tracks 17 extending across tape T at an angle to the longitudinal direction of the tape (FIG. 3). As shown in FIG. 3, head 12A scans alternating tracks, for example, tracks $17A_1$, $17A_2$, $17A_3$, $17A_4$, . . . while head 12B scans the remaining alternating tracks $17B_1$, $17B_2$, $17B_3$, $17B_4$, . . . Thus, adjacent tracks, such as tracks $17A_1$ and $17B_1$, are respectively scanned by the heads 12A and 12B.

Usually, but not necessarily, each of tracks 17 has recorded therein the signal information corresponding to a respective field interval of the video signals, and each track is divided into successive areas or increments each having recorded therein the signal information corresponding to a line interval of the respective field of the video signals. Each line interval and each field interval of the video signals contains a blanking and synchronizing portion and, in accordance with accepted practice, the relative movements of head and tape in the directions 15 and 16 preferably are regulated in accordance with the synchronizing signals of the video signals to be recorded so as to obtain so-called H-alignment of the areas in which line intervals are recorded in each track in alignment with the areas in which line intervals are recorded in the next adjacent tracks. In other words, as shown schematically in FIG. 3, the ends of the margins between the areas in which the line intervals are recorded in each of tracks 17 preferably are aligned, in the direction transverse to the lengths of the tracks, with the adjacent ends of such margins in the next adjacent tracks. However, this H-alignment configuration is not absolutely necessary for recording or reproducing video information on tape T.

As shown in FIG. 2, heads 12A and 12B have air gaps 18A and 18B, respectively, arranged at substantially different azimuth angles $\theta_1$ and $\theta_2$ in respect to the plane of rotation of heads 12A and 12B. Because of these different azimuth angles, each of heads 12A and 12B, when recording video signals in the respective tracks on tape T, effects magnetization of magnetic domains in the magnetic coating on tape T in what would appear to be, if such domains were visible, a series of parallel lines or stripes extending across the respective track and each having an orientation that corresponds to the azimuth angle $\theta_1$ or $\theta_2$ of the gap of the respective head 12A or 12B. When reproducing video signals which have been recorded with these different azimuth angles, each of tracks $17A_1$–$17A_4$ is scanned by head 12A and each of tracks $17B_1$–$17B_4$ is scanned by head 12B, so that gap 18A extends at an angle with respect to the domains in tracks $17B_1$–$17B_4$ but is aligned with the domains in tracks $17A_1$–$17A_4$ and, similarly, gap 18B extends at an angle with respect to the domains in tracks $17A_1$–$17B_4$ but is aligned with the domains in tracks $17B_1$–$17B_4$. Hence, if one head, such as head 12A, while scanning one track, such as track $17A_1$, overlaps an adjacent track, such as track $17B_1$, to reproduce as crosstalk the signals recorded in such adjacent track, the well-known azimuth loss causes attenuation of the crosstalk signals picked up from such adjacent track.

Figure 4:
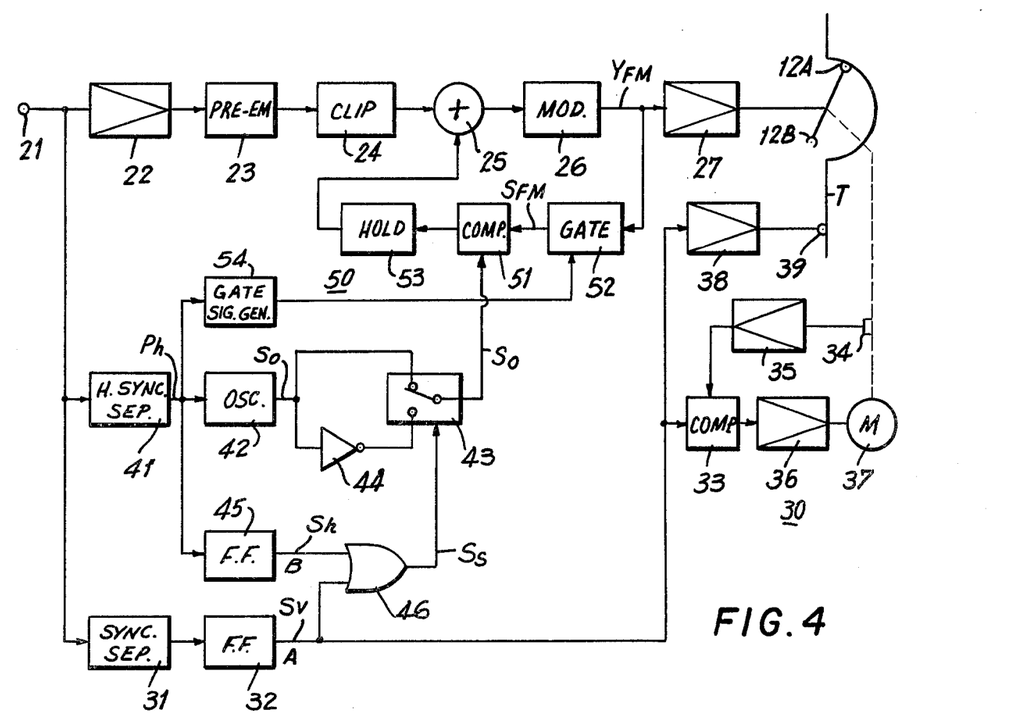
FIG. 4 is a block diagram representing one embodiment of the present invention by which a video signal component is recorded on the record medium shown in FIG. 3.

Turning now to FIG. 4, there is illustrated a block diagram of one embodiment of apparatus in accordance with the teachings of the present invention. For the purpose of simplification, the illustrated apparatus is directed to that portion of a color television signal recorder which is capable of recording the luminance component included in the color television signal. That is, the remainder of the recording circuitry which is used for recording the chrominance component is omitted from FIG. 4. As may be appreciated, if the video signal which is to be recorded comprises merely a monochrome (black-and-white) signal, then the apparatus illustrated in FIG. 4 is, essentially, complete for the recording of such a monochrome video signal.

The recording apparatus includes an input terminal 21 to which the luminance component of a composite color television signal or the monochrome video signal (both hereinafter being referred to as a video signal) is applied, this input terminal being coupled to a channel wherein the video signal is frequency modulated prior to recording on a record medium. The channel is comprised of an amplifier 22, which may be an automatic gain control amplifier, a pre-emphasis circuit 23 in which the high frequency response of the video signal is enhanced, a clipping circuit 24 wherein overshooting and undershooting portions of the enhanced video signal, as well as undesired amplitude modulations thereof, are eliminated or clipped, a frequency modulator 26 in which a carrier of relatively high frequency is frequency modulated by the enhanced, clipped video signal, and a recording amplifier 27. As shown, these circuits are connected in cascade. The output of recording amplifier 27 is coupled through suitable switching circuitry (not shown) to the rotary head assembly previously described with respect to FIG. 1 wherein heads 12A and 12B record successive tracks 17A and 17B across tape T.

As is conventional, the video signals applied to input terminal 21 also include synchronizing signals comprised of horizontal synchronizing signals and vertical synchronizing signals. The horizontal synchronizing signals separate successive line intervals of video information, and the vertical synchronizing signals define successive field intervals in which the line intervals are provided. A vertical synchronizing signal separator 31 is coupled to input terminal 21 and is adapted to separate the vertical synchronizing signals from the received video signal. Vertical synchronizing signal separator circuits are well known to those of ordinary skill in the art and need not be further described herein. A bistate device 32, such as a flip-flop circuit, is coupled to the output of the vertical synchronizing signal separator and is adapted to change its state, or condition, in response to each separated vertical synchronizing signal. As may be appreciated, the vertical synchronizing frequency of the separated vertical synchronizing signals is divided by flip-flop circuit 32, this flip-flop circuit producing an alternating signal whose half-cycle duration is equal to a field interval.

The output of flip-flop circuit 32 is coupled to a servo control circuit 30 which is adapted to control the operation of a drive motor 37 mechanically coupled to the rotary transducer assembly to insure that the respective heads 12A and 12B commence their scanning of a record track 17A and 17B at the beginning of a field interval. Servo control circuit 30 is comprised of a comparator 33 which is capable of comparing the phase of the alternating signal produced by flip-flop circuit 32 to the phase of heads 12A and 12B. The phase, or relative positions, of the heads is represented by a pulse signal generated by a pulse generator 34. In a typical embodiment, drive motor 37 is mechanically coupled to the rotary transducer assembly by a drive shaft, this shaft including an element, such as a magnet, aligned with one of heads 12A and 12B. A magnetic pick-up coil is positioned to sense the magnet and to generate an output pulse in response thereto; that is, to generate an output pulse when, for example, head 12A first comes into contact with tape T. The output of pulse generator 34 is coupled via a wave-shaping amplifier 35 to another input of comparator 33. An error signal proportional to the difference between the phase of the alternating signal produced by flip-flop circuit 32 and the phase of the pulse signals generated by pulse generator 34 is supplied as an adjusting signal to motor 37 via an amplifier 36. Hence, it is seen that servo control circuit 30 functions to bring heads 12A and 12B into contact with tape T at the beginning of a field interval such that a complete field interval is recorded in a given track across the tape. In an alternative embodiment, if more than one field interval is to be recorded in a track, servo control circuit 30 would be substantially the same as shown in FIG. 4, and flip-flop circuit 32 would be replaced by an appropriate divider circuit, whereby the alternating signal produced by such a divider circuit would be formed of half-cycle intervals which are substantially equal to the duration of each track.

The output of flip-flop circuit 32 also is used as a control signal which is recorded along a longitudinal edge of tape T for a purpose soon to be described. To this effect, the output of flip-flop circuit 32 is coupled through an amplifier 38 to a fixed transducer or head 39, whereby control signals 56 (FIG. 3) are recorded in alignment with particular tracks.

As mentioned previously, if the tracks in which the video signals are recorded are free of guard bands, and if such tracks exhibit minimal width, a crosstalk component will be picked up during a signal reproducing operation when a particular track is scanned, the crosstalk component being attributed to the video signals recorded in an adjacent track. Furthermore, even if the tracks are recorded by use of transducers having different azimuth angles, such as by use of heads 12A and 12B, the normal attenuation of crosstalk components due to azimuth loss is not effective to minimize such crosstalk components. Hence, it is necessary to process the video signals in a manner whereby crosstalk interference will be substantially reduced during a signal reproducing operation, and particularly when the reproduced video signal is displayed on a cathode ray tube. This crosstalk reduction is attained in accordance with the present invention by varying the phase of the frequency-modulated video signals recorded in one track relative to the phase of the frequency-modulated video signals recorded in an adjacent track. In one embodiment of this invention, and with reference to FIG. 3, the phase of the frequency-modulated video signal is changed by an odd multiple of $\pi$ in successive line intervals of, for example, track $17A_1$, but remains constant from one to the next line interval in adjacent track $17B_1$. This phase shift in successive line intervals is repeated in track $17A_2$, $17A_3$, . . . ; and the phase in successive line intervals of tracks $17B_2$, $17B_3$, . . . remains constant. In another embodiment, the phase of the video signals recorded in alternate line intervals of, for example, track $17A_1$ differs from the phase of the video signals recorded in alternate line intervals in adjacent track $17B_1$ by an odd multiple of $\pi$, such alternate line intervals in track $17A_1$ being adjacent the aforementioned alternate line intervals in track $17B_1$. A similar phase relation holds for the remaining tracks.

The manner in which the phase of the recorded video signals is controlled in accordance with the foregoing embodiments is shown by the phase control circuitry of FIG. 4. This phase control circuitry is comprised of a horizontal synchronizing signal separator 41, a controllable oscillator 42, a phase inverter 44, a switching circuit 43 and a phase-lock loop 50. Horizontal synchronizing signal separator 41 may be of conventional construction and is coupled to input terminal 21 so as to separate the horizontal synchronizing signal from the received video signal. The separated horizontal synchronizing signals produced by horizontal synchronizing signal separator 41 are supplied to oscillator 42 which is adapted to generate a local carrier, such as an alternating signal, of a predetermined frequency related to the horizontal synchronizing frequency. As will be explained, the frequency of this locally generated carrier is equal to the frequency of a predetermined component of the frequency-modulated video signal, as produced by frequency modulator 26. The separated horizontal synchronizing signals also are supplied to a divider circuit 45, such as a flip-flop circuit, and also to a gate signal generator 54.

Switching circuit 43 is shown diagramatically as having first and second inputs and a movable contact selectively switched between such inputs. Switching circuit 43 may be comprised of transistor switching devices, a diode switching array, or the like. One input of the illustrated switching circuit is supplied with the local carrier as generated by oscillator 42, and the other input of the illustrated switching circuit is supplied with a phase-inverted version of the local carrier, this phase inversion being effected by phase inverter 44. As an alternative, first and second phase shifting networks may be coupled between oscillator 42 and the respective inputs of switching circuit 43 so as to provide a relative phase shift of 180° in the carriers which are supplied to these switching circuit inputs.

Switching circuit 43 is controlled so as to selectively couple one or the other of the carriers supplied to its respective inputs to its output. Appropriate control over the switching circuit is achieved by an OR gate 46 having one input coupled to the output of flip-flop circuit 32 and another input coupled to the output of flip-flop circuit 45. As an alternative, and as will soon become apparent, OR gate 46 may be replaced by an AND gate. If the signal produced by flip-flop circuit 32 alternates between two levels, and if the signal produced by flip-flop circuit 45 also alternates between two levels, the control signal produced by OR gate 46 will exhibit a first level whenever either of the input signals thereto assumes a corresponding first level, and will exhibit a second level only when both input signals thereto assume a corresponding second level.

The selectively phase-shifted carrier produced at the output of switching circuit 43 is applied to a phase comparator 51. This phase comparator is included in phase-locked loop 50 and functions to compare the phase of the carrier which is applied thereto to the phase of a predetermined component included in the frequency-modulated video signal produced by frequency modulator 26. If it is assumed that frequency modulator 26 modulates a carrier with both the video signal and the horizontal synchronizing signal, it will be recognized that the frequency of the composite frequency-modulated signal will be a predetermined frequency for a substantial portion of the horizontal blanking interval. If this component of the frequency-modulated video signal, that is, this predetermined frequency which occurs during the horizontal blanking interval, is extracted from the frequency-modulated signal, and if the frequency of this component is equal to the frequency of the carrier generated by oscillator 42, then a phase comparison therebetween can be made. To this effect, a gate circuit 52 is coupled to the output of frequency modulator 26, the gate circuit including a control input coupled to the output of a gate signal generator 54, the latter being supplied with horizontal synchronizing signals which are separated by horizontal synchronizing signal separator 41. Accordingly, gate signal generator 54 is adapted to produce a gating signal in response to the horizontal synchronizing signals, the gating signal being timed to occur during a predetermined portion of the horizontal blanking interval. Gate 52 is actuated in response to this gating signal to supply the frequency-modulated signal to phase comparator 51 at this time.

The output of phase comparator 51 is supplied to a holding circuit 53 which, in turn, produces a control level proportional to the phase difference between the local carrier and predetermined component of the frequency-modulated signal then being applied to the phase comparator. This control signal, which may be a DC level, is added to the enhanced, clipped video signal in an adding circuit 25, the resultant signal being applied to frequency modulator 26. Holding circuit 53 may comprise a suitable analog storage device, such as a capacitor, or the like.

If the phase of the frequency-modulated video signal, and particularly the predetermined component thereof, as extracted by gating circuit 52, differs from the phase of the local carrier then supplied by switching circuit 43, comparator 51 produces an error signal which is supplied to holding circuit 53, thereby applying a control level to adding circuit 25 so as to vary the phase of the frequency-modulated video signal in a direction which nulls the error signal. That is, the phase of the frequency-modulated video signal is adjusted so as to be locked to the phase of the carrier signal produced at the output of the switching circuit.

The operation of the recording apparatus shown in FIG. 4 will best be understood in conjunction with the waveform diagrams shown in FIGS. 5A–5D. The vertical synchronizing signals which are separated by vertical synchronizing signal separator 31 from the received video signal are supplied to flip-flop circuit 32 so as to produce the alternating signal $S_v$, shown in FIG. 5A. This alternating signal preferably is a rectangular wave signal formed of successive half-cycles $T_a$ and $T_b$, each half-cycle representing a field interval. The horizontal synchronizing signals, which are separated from the received video signal by horizontal synchronizing signal separator 41 are applied to flip-flop circuit 45 so as to produce the alternating signal $S_h$, shown in FIG. 5B. This alternating signal preferably is a rectangular wave signal formed of successive half-cycles indicated as positive-going and negative-going pulses, each half-cycle having a duration of 1H, which is equal to a horizontal line interval.

Figure 5A:
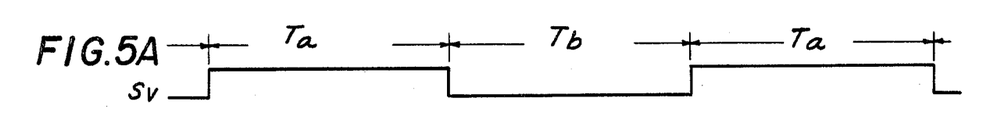
Figure 5B:
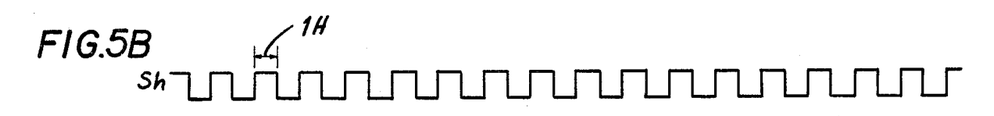
Figure 5C:
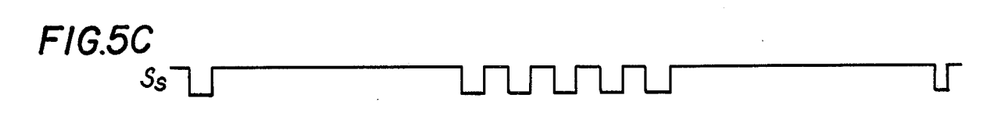
Figure 5D:
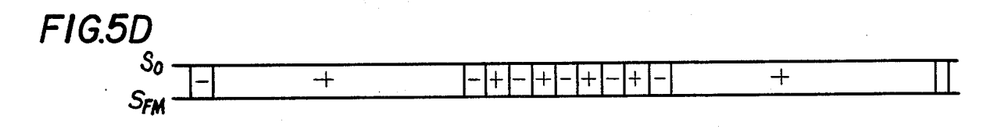

Signals $S_v$ and $S_h$ are combined in OR gate 46 so as to produce the control signal $S_s$, shown in FIG. 5C. As is apparent from the waveform diagrams, the control signal $S_s$ is coincident with half-cycles $T_a$ of alternating signal $S_v$ and is coincident with alternating signal $S_h$ during alternate half-cycles $T_b$ of signal $S_v$. This control signal $S_s$ controls switching circuit 43 to supply local carrier $S_o$, produced by oscillator 42, to comparator 51 whenever the control signal is of a relatively positive level, and to supply the phase-inverted version of local carrier $S_o$ whenever the control signal is of a relatively lower level. This is diagrammatically represented in FIG. 5D wherein the "+" portion represents the unshifted local carrier, and the "−" portion represents the phase-inverted local carrier. Since the frequency-modulated video signal is phase-locked to the local carrier supplied to comparator 51, it is appreciated that the phase of the frequency-modulated signal is shifted from 0° to 180°, as represented by the "+" and "−" portions shown in FIG. 5D.

When the selectively shifted phase of the frequency-modulated video signal is recorded in successive tracks on tape T by heads 12A and 12B, the phase in successive line intervals in the track corresponding to field interval $T_a$ is constant throughout. However, the phase of the frequency-modulated video signal which is recorded in the next adjacent track corresponding to field interval $T_b$ varies by 180° in successive line intervals. That is, the phase in this track will appear as, for example, 0° in one line interval and will be shifted by 180° in the next line interval, and will be shifted by 180° in the following line interval, and so on. As will be explained below, when the frequency-modulated video signals are recorded in accordance with this phase relationship, crosstalk interference is effectively eliminated from the video picture which ultimately is reproduced. Insofar as elimination of this crosstalk component is concerned, it is seen that the phase of the frequency-modulated video signal recorded in alternate line intervals during field interval $T_b$ differs from the phase of the frequency-modulated video signal recorded in alternate line intervals during field interval $T_a$ by 180°. That is, the phase of the first line interval in field interval $T_b$ differs from the phase of the first line interval in field interval $T_a$ by 180°. Also, the phase in the third line interval in field interval $T_b$ differs from the phase in the third line interval in field interval $T_a$ also by 180°. The remaining alternate line intervals in the respective field intervals exhibit this phase relationship. The remaining line intervals in field interval $T_b$ are in phase with the remaining line intervals in field interval $T_a$.

Control signals 56 recorded by transducer 39 along the longitudinal edge of tape T may be only the positive transitions in signal $S_v$, produced by flip-flop circuits 32, or only the negative transitions in this signal. Hence, these control signals serve to identify which tracks contain the aforedescribed phase-shifted frequency-modulated video signals. This identifying information is useful during a signal reproducing operation.

Signal $S_v$ also is applied as a control signal to servo control circuit 30. It is believed that one of ordinary skill in the art will fully understand how servo control circuit 30 operates; and in the interest of brevity, further description of this circuit is not provided.

The illustrated phase-locked loop for locking the phase of the frequency-modulated video signal to the phase of the local carrier which is produced at the output of switching circuit 43 is a preferred embodiment. Thus, the error signal produced by comparator 51 is used to adjust the frequency of the frequency-modulated video signal, thereby varying the phase of this frequency-modulated signal. Stated otherwise, a control signal is derived from the error signal produced by comparator 51, this control signal functioning to modulate the frequency of the frequency-modulated carrier. In an alternative embodiment, the output of frequency modulator 26 can be supplied through an adjustable phase-shifting circuit having a control input coupled to the output of holding circuit 53. In this alternative embodiment, the amount of phase shift imparted by the phase shifting circuit to the frequency-modulated video signal is a function of the control signal produced by holding circuit 53.

When the frequency-modulated video signal, recorded with the phase relation described hereinabove, is reproduced, the primary signal which is recovered from the track being scanned is accompanied by a crosstalk signal picked up from an adjacent track. The frequency of this crosstalk signal is an odd multiple of one-half the horizontal synchronizing frequency $f_H$. That is, the crosstalk signals picked up during the scanning of successive tracks have the frequency $(m+\frac{1}{2})f_H$, with this crosstalk signal being phase-inverted in successive horizontal line intervals. Consequently, if an interfering crosstalk signal is reproduced in one line interval and is inverted in phase during the following line interval, this phase relationship in the interfering signals results in visual cancellation of the crosstalk signals when a corresponding video picture is reproduced on a cathode ray tube. A mathematical explanation of this crosstalk cancellation effect now will be described.

Figure 6:
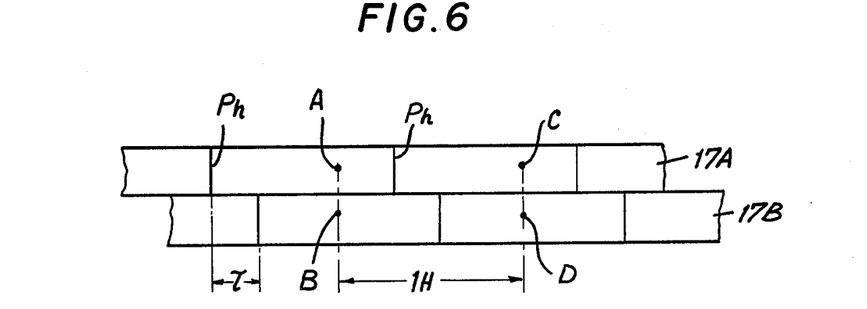
FIG. 6 is a schematic diagram showing a portion of successive, parallel record tracks and is useful in mathematically explaining the operation of the present invention.

Referring to FIG. 6, let it be assumed that the frequency-modulated signal $V_{FM}$ is recorded in successive tracks 17A and 17B, with the signal recorded at point A of track 17A represented as $Y_A$ wherein $$Y_A = \cos[\omega_c t + F(t)] \tag{1}$$

$$F(t) = \int f(t)dt = m_p \cos \omega_p t \tag{1a}$$

$$m_p = \Delta\omega/\omega_p \tag{1b}$$

in which $\omega_c$ is the angular frequency of the carrier which is frequency-modulated by the video signal, f(t) represents the modulating video signal, $m_p$ is the modulation index for the frequency-modulated signal, $\omega_p$ is the angular frequency of the modulating signal (i.e., the video signal frequency) and $\Delta\omega$ is the frequency deviation of the frequency-modulated signal.

In FIG. 3, the successive tracks are shown as being recorded in H-alignment. For the purpose of this mathematical explanation, let it be assumed that tracks 17A and 17B are not in H-alignment, but are displaced from each other by $\tau$. That is, the horizontal synchronizing signals $P_h$ recorded in each track are time (or phase) displaced by $\tau$. Now, if the frequency-modulated video signal $Y_{FM}$ at point B of track 17B is represented as $Y_B$, and if point B is displaced from point A by a field duration, then $Y_B$ may be expressed as $$Y_B = \cos[\omega_c(t-\tau) + F(t-\tau)] \quad (2)$$

Consequently, when a transducer, for example head 12A, scans track 17A so as to reproduce the signal at point A, the head will reproduce the signal $Y_A$ together with a crosstalk component due to the signal $Y_B$ recorded in adjacent track 17B. That is, the output signal $H_A$ produced by this head can be expressed as $$H_A = Y_A + kY_B \quad k<<1 \quad (3a)$$

$$H_A = \cos[\omega_c t + F(t)] + k\cos[\omega_c(t-\tau) + F(T-\tau)] \quad (3b)$$

wherein k represents the attenuation factor of the crosstalk signal picked up from point B of track 17B while point A of track 17A is scanned. That is, k represents the ratio of the crosstalk signal to the primary signal.

Let it be assumed that:

$$F(t-\tau) = F(t) - G(t) \quad (4)$$

$$g(t) = d/dt\, G(t) \quad (5)$$

If these equations are inserted into equation (3b) the following is obtained:

$$H_A = \cos[\omega_c t + F(t)] + k\cos[\omega_c t + F(t) - G(t) - \omega_c\tau] \quad (6a)$$

$$= M\cos[\omega_c t + F(t) - \phi] \quad (6b)$$

$$M^2 = 1 = 1 + k^2 + 2k\cos[G(t) + \omega_c\tau] \quad (6c)$$

$$\phi = \tan^{-1}\frac{k\sin[G(t) + \omega_c\tau]}{1 + k\cos[G(t) + \omega_c\tau]} \quad (6d)$$

As is conventional, if a frequency-modulated signal is expressed as equation 6(b), a demodulated output $R_A$ is proportional to the derivative of the term within the bracket of this equation. That is, the demodulated output $R_A$ can be expressed as $$R_A = \frac{d}{dt}[\omega_c t + F(t) - \phi) \quad (7a)$$

$$= \omega_c + f(t) - \frac{d\phi}{dt} \quad (7b)$$

In equation (7b), the expression f(t) represents the demodulated video signal, that is, the demodulated luminance signal $S_y$, and the expression $d\phi/dt$ represents the interfering signal due to crosstalk picked up from an adjacent track.

The interfering signal $d\phi/dt$ of equation (7b) can be represented as $N_A$, expressed as follows $$N_A = \frac{d\phi}{dt} = \frac{d}{dt}\tan^{-1}\frac{k\sin[G(t) + \omega_c\tau]}{1 + k\cos[G(t) + \omega_c\tau]} \quad (8a)$$

$$= \frac{g(t)k\cos[G(t) + \omega_c\tau] + k^2}{1 + k^2 + 2k\cos[G(t) + \omega_c\tau]} \quad (8b)$$

In equation (3a), it has been assumed that k is much less than unity. Accordingly, interfering signal $N_A$ due to crosstalk picked up from an adjacent track can be approximated by $$N_A \doteq g(t)k\cos[G(t) + \omega_c\tau] \quad (9)$$

As represented in equation (9), the crosstalk signal $N_A$ is produced when head 12A reproduces the signals recorded at point A in track 17A. The angular frequency of crosstalk signal $N_A$ is equal to G(t) and the phase of this crosstalk signal is equal to $\omega_c\tau$. As can be seen from equation (6a), if the angular frequency of the crosstalk signal picked up from point B is subtracted from the angular frequency of the primary signal reproduced at point A, the resultant angular frequency is equal to G(t). Also, if the phase of the crosstalk signal picked up from point B is subtracted from the phase of the primary signal reproduced at point A, the resultant phase is equal to $\omega_c\tau$.

The foregoing analysis of the signals which are reproduced when head 12A scans point A in track 17A is equally applicable to derive the mathematical expression for the signals which are reproduced when head 12B scans point B in track 17B. Thus, the crosstalk signal $N_B$ which is produced at point B due to the pickup of crosstalk from point A can be expressed as $$N_B = g(t)k\cos[(-G(t) - \omega_c\tau] \quad (10)$$

Let it now be assumed that point C in track 17A is spaced from point A by one line duration. Similarly, it is assumed that point D in track 17B is spaced from point B also by one line duration. As described hereinabove with respect to the apparatus shown in FIG. 4, the phase of the frequency-modulated video signal at either point C or point D is shifted by 180° with respect to the phase of the frequency-modulated video signal at points A or B, respectively. It is further assumed herein that the phase of the frequency-modulated signal at point D is shifted by $\pi$ relative to the phase of the signal at point B. Accordingly, the frequency-modulated video signals $Y_C$ and $Y_D$ reproduced from points C and D, respectively, may be expressed (with reference to point A) as follows:

$$Y_C = \cos[\omega_c(t+\tau_h) + F(t+\tau_h)] \quad (11)$$

$$Y_D = \cos[\omega_c(t-\tau+\tau_h) + F(t-\tau+\tau_h) + \pi] \quad (12)$$

wherein $\tau_h$ represents the difference between points A and C and between points B and D, respectively. In addition to the phase shift of $\tau$ between the signals recorded at points B and D, it also is noted that a phase shift of $\tau$ is provided between the signals $Y_C$ and $Y_D$ recorded at points C and D, respectively, in adjacent tracks. That is, the signals recorded in alternate line intervals in adjacent tracks (that is, the signals at points C and D) exhibit a phase shift therebetween of $\tau$. However, the signals recorded in the remaining intervals of adjacent tracks (that is, the signals at points A and B) do not exhibit this phase therebetween. Also, it may be considered that the signals recorded in successive line intervals in alternate tracks (such as track 17B) exhibit a relative phase shift therebetween equal to $\tau$.

Since video signals are relatively slowly time-varying signals, the information in one line interval is approximately the same as the information in the next succeeding line interval. Thus, the expression $(t+\tau_h)$ is approximately equal to t. Thus, equations, (11) and (12) can be rewritten as follows:

$$Y_C = \cos[\omega_c t + F(t)] \tag{11a}$$

$$Y_D = \cos[\omega_c(t-\tau) + F(t-\tau) + \pi] \tag{12a}$$

The foregoing mathematical derivation of crosstalk signals picked up from an adjacent track when a primary signal is reproduced is equally applicable to points C and D. Hence, the interfering signal $N_C$ due to crosstalk picked up from point D when point C is scanned can be expressed as:

$$N_C = g(t)k \cos[G(t) + \omega_c \tau - \pi] \tag{13}$$

Similarly, the interfering signal $N_D$ due to crosstalk picked up from point C when the point D is being scanned can be expressed as:

$$N_D = g(t)k \cos[-G(t) - \omega_c \tau + \pi] \tag{14}$$

Equations 13 and 14 can be rewritten as follows:

$$N_C = -g(t)k \cos[G(t) + \omega_c \tau] = -N_A \tag{13a}$$

$$N_D = -g(t)k \cos[-G(t) - \omega_c \tau] = -N_B \tag{14a}$$

A comparison between equations (9) and (13a) indicates that the interfering signal $N_C = -N_A$. Similarly, a comparison between equations (10) and (14a) indicates that the interfering signal $N_D = -N_B$. Thus, the crosstalk interference N(t) produced in one horizontal line interval is 180° out-of-phase (or phase inverted) with respect to the crosstalk interference produced in the following horizontal line interval. Since this crosstalk interference is inverted from line-to-line, such interference visually cancels in the reproduced video picture.

While the foregoing mathematical explanation shows that crosstalk interference is substantially eliminated when the frequency-modulated video signal is phase-inverted from line-to-line in alternate field intervals while exhibiting a constant phase from line-to-line in the remaining field intervals, a similar mathematical result is achieved if phase shifting occurs in all field intervals. For example, the phase of the frequency-modulated video signal recorded at point A may be equal to the phase of the frequency-modulated video signal recorded at point B. However, the phase of the frequency-modulated video signal recorded at point C may be shifted by +90° relative to point A, while the phase of the frequency-modulated video signal recorded at point D may be shifted by −90° relative to point B. Nevertheless, the relative phase difference between the frequency-modulated video signals recorded at points C and D is 180°. Hence, in this example, the phase difference between the signals recorded in alternate line intervals in adjacent tracks is equal to 180°, while the phase difference between the remaining line intervals in the adjacent tracks is approximately 0°. With this phase difference between the alternate line intervals in adjacent tracks, the crosstalk interference $N_C$ will be equal to the phase-inverted version of the crosstalk interference $N_A$ at point A ($N_C = -N_A$); and the crosstalk interference $N_D$ at point D will be equal to the phase-inverted version of the crosstalk interference $N_B$ at point B ($N_D = -N_B$). Thus, visual cancellation of the crosstalk interference will be achieved in the reproduced video picture.

Figure 7:
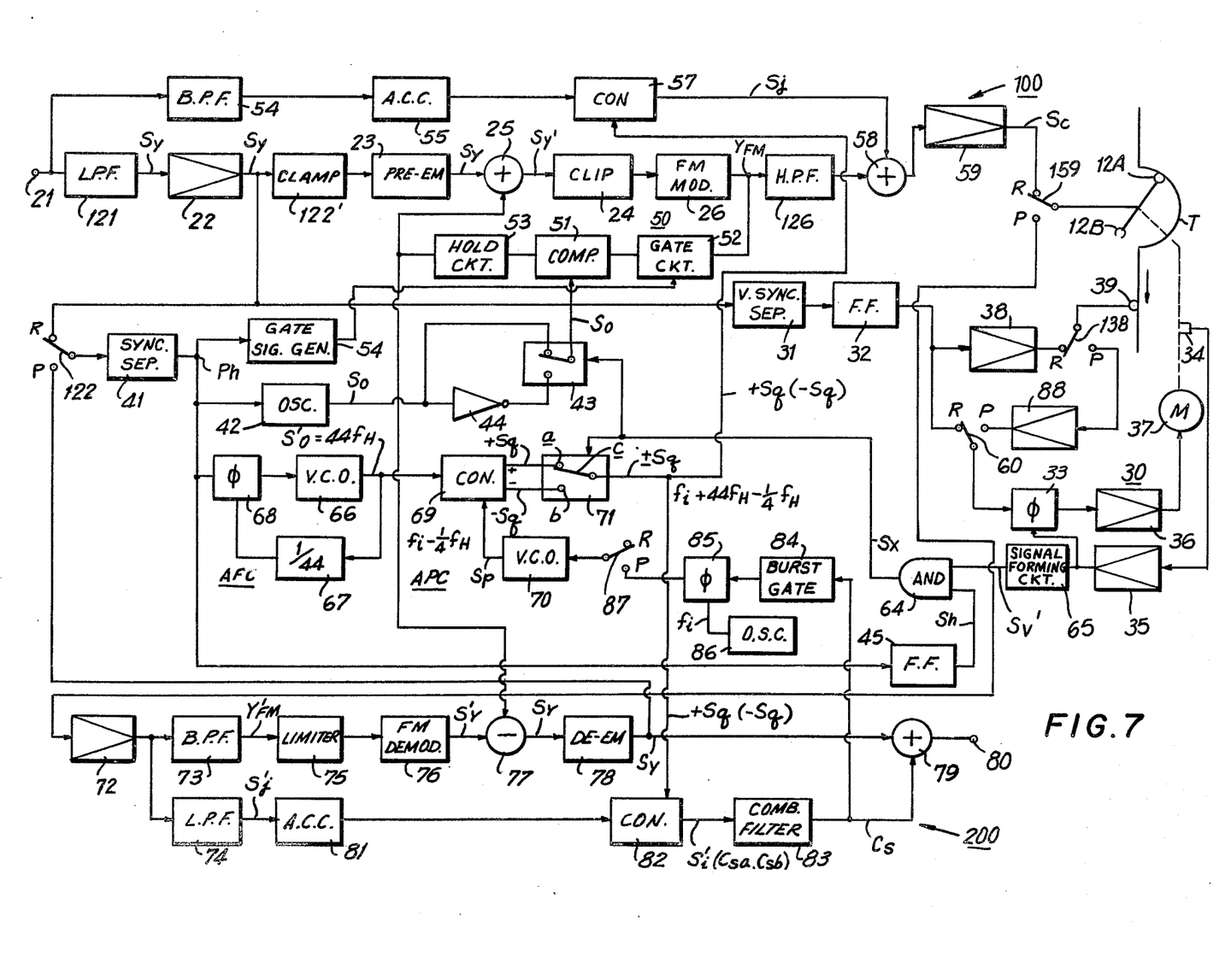
FIG. 7 is a block diagram of recording and reproducing apparatus incorporating the present invention.

The apparatus shown in FIG. 4 is adapted to be incorporated into apparatus for recording and/or reproducing a composite color television signal onto tape T. One embodiment of such apparatus is illustrated in FIG. 7 which includes a recording section 100 and a reproducing section 200. The recording section is provided with an input terminal 21 for receiving composite color television signals which include luminance and chrominance components and are composed of line, field and frame intervals with blanking and synchronizing portions in each of those intervals. The composite color signals are applied from input terminal 21 to a low pass filter 121 which transmits substantially only the luminance signal $S_Y$ to automatic gain control amplifier 22, the latter applying an amplified luminance component to a clamp circuit 122 for clamping the luminance component to a fixed reference level, as is typical in such recording apparatus. The clamped luminance component is applied to pre-emphasis circuit 23 and then to adding circuit 25, as described previously with respect to FIG. 4. The output $S'_Y$ of adding circuit 25 is supplied through clipping circuit 24 to frequency modulator 26 wherein it modulates an FM carrier. A comparison of FIGS. 4 and 7 indicates that clipping circuit 24 may be provided either before or after adding circuit 25. The frequency modulated luminance component $Y_{FM}$ from modulator 38 is passed through a high pass filter 126 to a mixing or adding circuit 58.

In accordance with this invention, and as previously described with reference to FIG. 4, the frequency modulated luminance component $Y_{FM}$ is selectively phase-shifted by an odd multiple of $\pi$ between adjacent line intervals. As will be recalled, this is achieved by using phase-locked loop 50 to lock the phase of the frequency-modulated luminance component to the phase of phase-controlled local carrier $S_o$, the local carrier being produced by oscillator 42 and phase controlled by inverter 44 and switching circuit 43. Oscillator 42 may be a ringing oscillator synchronized to the frequency of the horizontal synchronizing signal, as separated from the composite color signal by horizontal synchronizing signal separator 41, and having a frequency equal to the frequency of a predetermined component (e.g., the horizontal blanking interval) of the frequency-modulated luminance component.

In the FIG. 7 embodiment, switching circuit 43 is controlled by a control signal $S_x$ which is generated by an AND gate 64 in response to signals $S_h$ produced by flip-flop circuit 45 and to signals $S_v'$, the latter being similar to signals $S_v$ of FIG. 5A, to apply control signals so as to selectively enable either the unshifted local carrier ($+S_o$) or the phase-shifted local carrier ($-S_o$) to be coupled to comparator 51, as described previously. The control signals $S_x$ are similar to control signals $S_s$ (FIG. 5C), and will be described greater below.

The composite color television signals applied to input terminal 21 also are coupled to a band pass filter 54 which separates the chrominance component $S_i$ from the composite color signals and passes the chrominance component through an automatic color control circuit 55 to a frequency converter 57 in which the chrominance component and its carrier is converted from an original frequency $f_i$ to a frequency band lower than that of the frequency modulated luminance component $Y_{FM}$ supplied to mixing circuit 58. The frequency converted chrominance component $S_j$ also is supplied to mixing circuit 58 whereat it is combined with the frequency modulated luminance component $Y_{FM}$ for providing a composite signal $S_c$ which is supplied through a recording amplifier 59 and a record terminal R of a record/playback switch 159 to the rotary heads 12A and 12B.

The luminance component $S_Y$ from automatic gain control circuit 22 also is supplied to vertical synchronizing signal separator 31, as in the FIG. 4 embodiment. The separated vertical synchronizing signals $P_v$ are applied from separator 31 to flip-flop divider 32 which is operative to provide control signals at a repetition rate which is a predetermined fraction ($\frac{1}{2} \times n$) of the repetition rate of the separated vertical synchronizing signals, in which n is the number of field intervals to be recorded in each of the tracks and is equal to one in the illustrated embodiment. The control signals produced by flip-flop circuit 32 occur in correspondence with the recording of color video signals in alternating, or every other one of the tracks so as to identify or distinguish between the tracks in which the chrominance component is recorded with first and second carriers, as hereinafter described in detail. Accordingly, the control signals are applied through an amplifier 38 and a record terminal R of a record/playback switch 138 to fixed transducer 39, as in the FIG. 4 embodiment.

The control signals from flip-flop circuit 32 also are supplied to servo control circuit 30 via the record terminal R of a record/playback switch 60. This servo control circuit has been discussed with respect to the embodiment of FIG. 4 and is seen to provide a brake control or servo signal which is passed through a servo amplifier 36 for either suitably decreasing or increasing the speed at which heads 12A and 12B are driven by motor 37, so that heads 12A and 12B will commence to move along respective tracks on tape T at the commencement of alternating field intervals of the color video signals being recorded.

The separated horizontal synchronizing signals $P_h$ are applied from separator 41 to flip-flop circuit 45 which, it is recalled, produces control signal $S_h$ for application here to one input of AND gate 64. The output of wave forming circuit 35 is also applied to a signal forming circuit 65 which produces the previously mentioned control $S'_v$ applied to a second input of AND gate 64. Control signal $S_h$ is a rectangular wave having high and low intervals, each equal to one line interval H, and control signal $S'_v$ is a rectangular wave having high and low intervals, each equal to one field interval V, so that control signal $S_x$ from AND gate 64 remains low during one entire field interval and goes high only during alternate line intervals of the alternate field interval. This differs from previously described control signal $S_s$ (FIGS. 4 and 5) only in the particular field interval, or half-cycle, during which control signal $S_x$ is substantially coincident with signal $S_h$.

In the embodiment shown in FIG. 7, control signal $S_x$ also controls the establishment of different carriers for the frequency converted chrominance component $S_j$ to be recorded in tracks that are next adjacent to each other, with such carriers differing from each other in their phase characteristics.

The apparatus for providing different carriers with which to frequency convert the chrominance component included in the composite color signal includes a voltage controlled oscillator 66 for providing an output oscillation with a center frequency of, for example, $44f_H$. The output of oscillator 66 is applied to a frequency divider 67 to be frequency-divided by a factor of 44, and the output of divider 67 is applied to a comparator 68 wherein the frequency of the output oscillation is compared to the frequency of the separated horizontal synchronizing signals $P_h$ which are supplied from separator 51. Upon any frequency deviation between the signals applied to comparator 68, a suitable control voltage is supplied thereby to voltage controlled oscillator 66 so that the frequency of the oscillation output is automatically controlled or maintained at $44f_H$.

The oscillation output from oscillator 66 is applied to a frequency converter 69, which may be in the form of a balanced modulator, to frequency convert the oscillation output by a frequency converting signal $S_p$ produced by a voltage controlled oscillator 70 having a center frequency of $f_i + \frac{1}{4}f_H$, in which $f_i$ is the original or standard carrier frequency of the chrominance component $S_i$ of the received color video signals. Balanced modulator 69 has two outputs (+ and −) of opposite polarity for providing frequency converting signals $+S_q$ and $-S_q$, respectively. Such frequency converting signals $+S_q$ and $-S_q$ are of opposite phase or polarity, but each has the frequency $(f_i + 44f_H - \frac{1}{4}f_H)$.

The frequency converting signals $+S_q$ and $-S_q$ are applied selectively to frequency converter 57 through a switching circuit 71, shown schematically as having fixed contacts a and b respectively connected to the + and − outputs of balanced modulator 69 and a movable contact c which is switchable between contacts a and b and is connected to frequency converter 57. Switching circuit 71 is controlled by control signal $S_x$ produced by AND gate 64 so that the switching circuit applies frequency converting signal $+S_q$ to converter 57 whenever control signal $S_x$ has a low value, and the switching circuit applies frequency converting signal $-S_q$ to the converter whenever control signal $S_x$ has a high value. By alternately applying frequency converting signals $+S_q$ and $-S_q$ to frequency converter 57, the carrier of the chrominance component is converted from its original carrier frequency $f_i$ to a relatively lower carrier frequency $f_c = 44f_H - \frac{1}{4}f_H$, the converter carrier frequency $f_c$ being below the frequency band of the frequency modulated luminance component $Y_{FM}$, and the phase or polarity of the frequency converted chrominance component $S_j$ is alternately reversed in response to the alternately applied frequency converting signals.

The converted carrier frequency $f_c$ of the frequency converted chrominance component $S_j$ satisfies the equation $$f_c = \tfrac{1}{4}f_H(2m-1)$$

in which m is a positive integer. Of course, in the present case, in which $f_c = 44f_H - \frac{1}{4}f_H$, the value for m is 88. As a result of this converted carrier frequency $f_c$, the second harmonic of the converted carrier is interleaved with the luminance component so as to avoid beat interference therebetween. By avoiding such beat interference, the frequency converted chrominance component can be recorded with a relatively high amplitude in respect to the amplitude of the frequency modulated luminance component, thereby obtaining a good signal-to-noise ratio of the chrominance component.

When the frequency converted chrominance component $S_j$ and the frequency modulated luminance component $Y_{FM}$ are combined in mixing circuit 58, the frequency converted chrominance component $S_j$ amplitude modulates the frequency modulated luminance component $Y_{FM}$ to supply a composite signal $S_c$ through amplifier 59 and record/playback switch 159 to heads 12A and 12B for recording in the successive parallel tracks on tape T.

Switches 60, 87, 122, 138 and 159 are ganged, or interconnected, for simultaneous change-over from their recording positions, shown in FIG. 7, to their reproducing or playback positions in which the movable contact of each switch engages its playback terminal or contact P. In the reproducing section 200, a reproducing amplifier 72 is coupled to heads 12A and 12B via the playback terminal P of switch 159 for receiving the signals alternately reproduced by the heads from the successive parallel tracks on tape T. The output of reproducing amplifier 72 is connected in common to a band pass filter 73 and a low pass filter 74 which respectively separate the reproduced frequency modulated luminance component $Y'_{FM}$ and frequency converted chrominance component $S'_j$. The frequency modulated luminance component $Y'_{FM}$, separated from the reproduced signals, is passed through a limiter 75 to a frequency demodulator 76 so as to obtain a demodulated luminance component $S'_Y$. It will be noted that the demodulated luminance component $S'_Y$ obtained from demodulator 76 will have changes in the level thereof corresponding to the control levels which had been added to the luminance component $S_Y$ in adding circuit 25 by holding circuit 53 in recording section 100. It will be recalled that this control level is effective to phase-lock the frequency modulated luminance component to the local carrier $S_o$. In order to eliminate such changes in level of the demodulated luminance component $S'_Y$, that is, the additional component which is due to the phase shifting of the frequency modulated luminance component, the demodulated component is applied to a subtracting circuit 77 which is also connected to the output of holding circuit 53 so as to receive the control level produced by the holding circuit. As will be explained below, the control level produced by holding circuit 53 during a reproducing operation is substantially equal to the control level that had been reproduced thereby during a recording operation. Hence, this control level is removed from the luminance component $S_Y'$ to result in luminance component $S_Y$ which is applied through a de-emphasis circuit 78 to a mixing or adding circuit 79 having its output connected to an output terminal 80.

The frequency converted chrominance component $S'_j$, separated from the reproduced signals by filter 74, is applied through an automatic color control circuit 81 to a frequency reconverter 82 which alternatively receives the frequency converting signals $+S_q$ and $-S_q$ from switching circuit 71, and by which the carrier of the reproduced chrominance component $S'_j$ is reconverted to the original carrier frequency $f_i$. The resulting frequency reconverted chrominance component $S'_i$ is passed through a comb filter 83 in which, as hereinafter described in detail, chrominance components of crosstalk signals are cancelled or suppressed so that only the chrominance component $C_S$ of the video signals being reproduced from a particular track is passed to mixing circuit 79 whereat it is combined with the luminance component $S_Y$ from de-emphasis circuit 78. Hence, the desired reproduced video signals are applied by mixing circuit 79 to output terminal 80.

The chrominance component $C_S$ from comb filter 83 also is applied to a burst gate 84 adapted to extract burst signals from the reconverted chrominance signal component. The extracted burst signals are applied to one input of a phase comparator 85, and an oscillator 86 applies an output at the standard or original chrominance carrier frequency $f_i$ to a second input of the phase comparator. The output of phase comparator 85 is connected through playback terminal P of switch 87 to voltage controlled oscillator 70. It will be apparent that, in the reproducing mode of operation, any phase difference between the burst signals extracted by gate 84 from the reconverted chrominance component and the output of oscillator 86 causes comparator 85 to apply a suitable control voltage to voltage controlled oscillator 70 for effecting a required change in the phase of the converting signals $+S_q$ and $-S_q$ whereby to achieve an automatic phase control function for eliminating so-called jitter from a picture or image produced on a cathode ray tube in response to video signals obtained at output terminal 80.

In the reproducing mode of operation, control signal $S_x$ for operating switching circuits 43 and 71 again is obtained from AND gate 64 in response to control signals $S_v'$ and $S_h$ from signal forming circuit 65 and flip-flop 45, respectively. As before, the signal forming circuit 65 responds to the output of wave forming circuit 35 which, in turn, is responsive to the pulse signals from pulse generating means 34. However, in the reproducing mode, fixed head 39 reproduces the recorded control signals 56 which are applied through playback terminal P of switch 138 and through an amplifier 88 to comparator 33 via playback terminal P of switch 60. Thus, comparator 33 compares the phase of the reproduced control signals 56 with the output of wave forming circuit 35 so as to provide a suitable servo control signal which is applied through servo amplifier 36 for controlling the rotation of heads 12A and 12B by motor 37. Hence, the servo control arrangement is effective, in the reproducing mode, to ensure that each of the tracks on tape T will be scanned by the same head 12A or 12B which was employed for recording video signals in such track, and further to ensure that the control signal $S'_v$ applied to AND gate 64 will have the same relationship to the reproduced video signals as it had to the recorded video signals. In other words, if control signal $S'_v$ has its low and high values during the recording of video signals by heads 12A and 12B, respectively, control signal $S'_v$ will similarly have its low and high values during the reproducing of the signals by heads 12A and 12B, respectively. Further, the output of de-emphasis circuit 78 is connected through the playback terminal of switch 122 to horizontal sync separator 41, whereby the separator separates horizontal synchronizing signals from the reproduced luminance component $S_Y$ in order to control oscillator 42 and flip-flop circuit 45 in the reproducing mode similar to the control obtained in the recording mode.

In a recording operation, each of switches 60, 87, 122, 138 and 159 is in its recording position in contact with its recording terminal R. Vertical synchronizing signal separator 31 separates vertical synchronization signals from the composite color video signals which are received at input terminal 21 to trigger flip-flop circuit 32 so that the alternating signal $S_v$ (FIG. 5) produced by the flip-flop circuit is compared in phase comparator 33 with the output of wave forming circuit 35. It is recalled that the signal produced by circuit 35 represents the rotary positions of heads 12A and 12B. Hence, phase comparator 33 provides a suitable servo control signal for controlling the rotary movements of heads 12A and 12B such that the heads commence the scanning of alternating tracks 17 on tape T at the commencement of respective field intervals of the color video signals.

During recording, the operation of switching circuit 43 is controlled by control signal $S_x$ produced by AND gate 64 whose output is analogous to the waveform shown in FIG. 5C. Consequently, the phase of local carrier $S_o$ which is applied to comparator 51 is selectively shifted, as described above. The selectively shifted phase of the local carrier $S_o$ is compared to the phase of the frequency modulated luminance component, and any phase differential therebetween is used to generate a control level which is added to the luminance component in adding circuit 25. This control level, when applied to frequency modulator 26, modulates the frequency of the FM carrier in a direction to lock its phase to the selectively shifted phase of local carrier $S_o$. Hence, the frequency modulated luminance signal is phase locked to the local carrier. The resulting phase shifted frequency modulated luminance component $Y_{FM}$ is recorded in successive tracks on tape T by heads 12A and 12B, respectively, such that the phase difference between alternate line intervals in adjacent tracks is equal to an odd multiple of $\pi$, as explained mathematically hereinabove.

Also, during recording, the chrominance component $S_i$, having an original carrier frequency $f_i$, is separated from the received color video signals and is frequency converted in frequency converter 57 by the frequency converting signal $+S_q$ or $-S_q$ so as to provide the frequency converted chrominance component $S_j$ with the reduced carrier frequency $f_c = 44f_H - \frac{1}{2}f_H$. Thus, the frequency band of the frequency converted chrominance component $S_j$ is lower than that of the frequency modulated luminance component $Y_{FM}$ with which it is combined in mixing circuit 58 to form the composite or combined signal $S_c$ which is recorded by heads 12A and 12B in successive tracks on tape T. Switching circuit 71, which is controlled by the control signal $S_x$ from AND gate 64, selectively determines which frequency converting signal $+S_q$ or $-S_q$ is applied to frequency converter 57. Since frequency converting signals $+S_q$ and $-S_q$ are of opposite phase or polarity, the resulting frequency converted chrominance component $S_j$ is provided with respective carriers $C_a$ and $-C_a$ which are similarly of opposed phase or polarity. It is appreciated that control signal $S_x$ remains low during one entire field interval recorded by, for example, head 12A, and goes high only during alternate line intervals of the next field interval, for example, the field interval recorded by head 12B. Thus, during each field interval recorded by head 12A, frequency converting signal $+S_q$ is continuously applied to frequency converter 57 with the result that the successive line intervals of each field interval recorded by head 12A are provided with a carrier of the same polarity. During successive line intervals of each field interval recorded by head 12B, frequency converting signals $+S_q$ and $-S_q$ are alternately applied to frequency converter 57 so that the successive line intervals of each field interval recorded by head 12B are alternately recorded with the carriers $C_a$ and $-C_a$ of opposed polarity. As one example of the foregoing, head 12A will scan tape T during intervals $T_a$ and head 123 will scan tape T during intervals $T_b$, as shown in FIG. 5A.

In a reproducing operation, each of switches 60, 87, 122, 138 and 159 is in its reproducing position in contact with its reproducing or playback terminal P, with the result that the signals reproduced by the heads 12A and 12B from the successive tracks on tape T are applied through switch 159 and reproducing amplifier 72 to filters 73 and 74 which respectively separate the frequency modulated luminance component $Y'_{FM}$ and the frequency converted chrominance component $S'_j$ from the reproduced signals. During reproduction, the rotation of heads 12A and 12B is servo-controlled by comparing the control signals 56 reproduced from tape T by fixed head 39 with the pulse from pulse generating means 34, so that those signals which had been recorded in respective tracks by heads 12A and 12B will be reproduced by the same heads. Because of this servo control of the rotation of heads 12A and 12B, the control signals $S'_v$ from signal forming circuit 65, and thus the control signal $S_x$ from AND gate 64, have the same relationships to the operative positioning of the heads 12A and 12B during the reproducing operation as during the recording operation. Thus, switching circuits 43 and 71 are controlled in the same manner during both recording and reproduction.

The frequency modulated luminance component $Y'_{FM}$ separated from the reproduced signals is demodulated in frequency demodulator 76 so as to obtain the demodulated luminance component $S'_Y$ which, as previously noted, will be accompanied by an additional component due to the selective phase shifting of the frequency modulated luminance component during recording. Since switching circuit 43 is controlled in synchronism with the reproduced frequency modulated luminance signal (because of synchronized control signal $S_x$), the selective phase shifting of local carrier $S_o$ at the output of switching circuit 43 corresponds to the selective phase shifting of the reproduced frequency modulated luminance component. It is appreciated that, during reproduction, there is no luminance component $S_Y$ applied to adding circuit 25. Nevertheless, an FM carrier is provided at frequency modulator 26, which FM carrier is compared in comparator 51 to the phase of local carrier $S_o$. As the phase of local carrier $S_o$ is shifted, an error signal is produced by comparator 51 and holding circuit 53 to vary the phase of the FM carrier so as to achieve a phase-locked relation. Thus, holding circuit 53 generates a control level during signal reproduction that is substantially equal to the control level generated thereby during signal recording and which is present as the additional component in the demodulated luminance component $S'_Y$. By subtracting this generated control level from the luminance component $S_Y'$ in subtracting circuit 77, the recovered luminance component $S_Y$ is substantially equal to the original luminance component.

During reproduction, crosstalk interference in the reproduced luminance component is eliminated partly because of the different azimuth angles of heads 12A and 12B, and also by reason of the fact that the frequency modulated luminance component is recorded with different phases in adjacent tracks, as described above with respect to FIGS. 4 and 6. Thus, as previously described, in the event that each of the tracks on tape T has a small width so as to increase the recording density, in which case the azimuth loss is not sufficient to prevent crosstalk in respect to the frequency modulated luminance component, the reproducing head 12A, for example, when scanning track 17A$_2$, will pick up the signals recorded in that track and also, to some extent, the signals recorded in the next adjacent track 17B$_1$. However, the crosstalk component in each line interval reproduced by head 12A from track 17B$_1$ will differ in phase from the crosstak component in the next adjacent line interval by an odd multiple of $\pi$. Similarly, the crosstalk component in each line interval reproduced by head 12B from track 17A$_2$ when this head scans track 17B$_2$ will differ in phase from the crosstalk component in the next adjacent line interval by an odd multiple of $\pi$. Accordingly, the interfering or noise signal due to crosstalk will be inverted in phase in successive horizontal intervals of the video signals. Thus, when the reproduced video signals obtained at output terminal 80 are applied to a cathode ray tube, the interfering or noise signal due to luminance component crosstalk will visually cancel itself on the screen of the cathode ray tube, and will not appear as a conspicuous noise or beat in the displayed image.

Considering the frequency converted chrominance component, the effect of providing this component with carriers C$_a$, −C$_a$ of reversed phase or polarity in successive line intervals or areas of each track recorded by head 12B results in a new carrier C$_b$ having frequency components offset by $\frac{1}{2}f_H$ with respect to the frequency components of the carrier C$_a$ with which the frequency converted chrominance component is recorded in the next adjacent tracks by head 12A so as to interleave therewith. Accordingly, when, for example, head 12A scans track 17A$_2$ on tape T for reproducing the frequency converted chrominance component recorded therein with the carrier C$_a$, the undesired or crosstalk signal simultaneously reproduced by head 12A from the next adjacent track 17B$_1$ has its frequency converted chrominance component provided with a carrier (C$_b$) in frequency interleaving relation to the carrier C$_a$. Similarly, when, for example, head 12B scans track 17B$_1$ for reproducing the frequency converted chrominance component recorded therein with the carrier C$_b$, the undesired or crosstalk signal simultaneously reproduced by head 12B from the next adjacent track 17A$_2$ has its frequency converted chrominance component provided with a carrier (C$_a$) in frequency interleaving relation to the carrier C$_b$.

Since switching circuit 71 is controlled by control signal S$_x$ in the same manner during both recording and reproduction, frequency reconverter 82 in the reproducing section 200 continuously receives the frequency converting signal +S$_q$ during the scanning of a track by head 12A, and frequency converting signals +S$_q$ and −S$_q$ are alternately applied to frequency reconverter 82 for successive line intervals during the scanning of a track by head 12B. Hence, during the scanning of a track by head 12A, frequency reconverter 82 reconverts the carrier C$_a$ of the chrominance component then being reproduced to a carrier C$_{sa}$ having the original carrier frequency f$_i$, while the carrier C$_b$ of the crosstalk chrominance component has its frequency similarly converted so as to be spaced midway between the principal side bands of the desired carrier C$_{sa}$. Similarly, during the scanning of a track by head 12B, frequency reconverter 82 frequency reconverts the carrier C$_b$ of the chrominance component then being reproduced to a carrier C$_{sb}$ also having the original frequency f$_i$, while the carrier C$_a$ of the crosstalk chrominance component has its frequency converted so as to be spaced midway between the principal side bands of the desired carrier C$_{sb}$. Thus, the reconverted carriers C$_{sa}$ and C$_{sb}$ of the chrominance component reproduced during alternate field intervals both have the same carrier frequency f$_i$, while the chrominance component of the undesired or crosstalk signal is, in each case, spaced midway between the principal side bands of the desired carrier and can be eliminated by comb filter 83 to yield the desired reconverted chrominance component C$_s$ which is free of any crosstalk chrominance component.

It will be apparent from the above that, in the described recording and/or reproducing apparatus according to this invention, the resultant video picture which is displayed in response to the reproduced color video signals obtained at output terminal 80 will be free of crosstalk interference even though the video signals have been recorded without guard bands between successive parallel tracks on tape T and even though such tracks have been provided with a very small width so as to attain a high recording density.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims. For example, the record medium need not be limited solely to a magnetic tape; but may comprise a magnetic sheet, a magnetic disc, a photo-optical medium, or the like, having successive adjacent tracks recorded thereon. Other changes and modifications have been suggested at various portions of the foregoing specification; and it is intended that the appended claims be interpreted as including such changes and modifications.

What is claimed is:

1. A method of recording a video signal component in successive parallel tracks on a record medium, said video signal component having signal information occurring in successive line intervals, comprising the steps of frequency modulating a carrier with said video signal component to produce a frequency modulated video signal; selectively shifting the phase of said carrier of said frequency modulated video signal in selected line intervals thereof; and recording the frequency modulated video signal and the frequency modulated video signal having its carrier phase shifted in said parallel tracks such that the phase difference between said carrier of said frequency modulated video signal in at least some adjacently recorded line intervals of successive tracks is an odd multiple of $\pi$.

2. The method of claim 1 wherein the step of selectively shifting the phase of said carrier in selected line intervals comprises shifting the relative phases of said carrier by an odd multiple of $\pi$ between alternate line intervals which are recorded adjacent to each other in successive tracks.

3. The method of claim 1 wherein the step of selectively shifting the phase of said carrier in selected line intervals comprises shifting the relative phases of said carrier by an odd multiple of $\pi$ between successive line intervals which are recorded in the same track.

4. The method of claim 3 wherein said step of recording the frequency modulated video signal and the frequency modulated video signal having its carrier phase shifted comprises recording alternate tracks containing the successive line intervals having carriers with unshifted and shifted phase therebetween and recording remaining tracks separating said alternate tracks containing successive line intervals of carriers with constant phase.

5. The method of claim 1 wherein said video signal component has successive field intervals, and successive line intervals are provided during each field interval, and wherein the step of selectively shifting the phase of said carrier comprises deriving a first repetitive signal synchronized with the field rate at which said successive field intervals recur; deriving a second repetitive signal synchronized with the line rate at which said successive line intervals recur; combining said first and second signals to produce a control signal; and using said control signal to shift the phase of said carrier.

6. The method of claim 5 wherein said first and second signals each are rectangular wave signals, the repetition frequency of said second signal being greater than the repetition frequency of said first signal; and said step of combining said first and second signals comprises gating said first and second signals to produce a rectangular wave control signal having a first portion substantially coincident with said first signal and a second portion substantially coincident with said second signal, said first and second portions alternating with each other.

7. The method of claim 6 wherein said step of using said control signal to shift the phase of said carrier comprises shifting said phase only during predetermined intervals of said second portion of said control signal.

8. The method of claim 1 wherein said step of selectively shifting the phase of said carrier comprises generating a local carrier signal of predetermined frequency equal to the frequency of said carrier; selectively shifting the phase of said local carrier signal; extracting said carrier from said frequency modulated video signal; and controlling the phase of said carrier to phase lock said carrier to said selectively phase shifted local carrier signal.

9. The method of claim 8 wherein said step of shifting the phase of said local carrier signal comprises generating a control signal representing successive line intervals occurring during alternate field intervals included in said video signal component; and shifting the phase of said local carrier signal by an odd multiple of $\pi$ during alternate ones of the line intervals represented by said control signal.

10. The method of claim 1 wherein said video signal component is the luminance component of a composite color television signal of the type including also a chrominance component; and further comprising the steps of separating said luminance and chrominance components from said composite color television signal; frequency converting said chrominance component to a frequency band below the frequency band of the frequency modulated luminance component; combining said frequency converted chrominance component selectively with the frequency modulated luminance component and the frequency modulated luminance component having its carrier phase shifted; and recording the combined components in the same track on said record medium.

11. The method of claim 10 wherein said step of frequency converting the chrominance component comprises converting the carrier of said chrominance component to a first carrier for recording in one track; and converting the carrier of said chrominance component to a second carrier having the same frequency as said first carrier for recording in the next adjacent track.

12. The method of claim 11 wherein said first and second carriers have different phase characteristics.

13. The method of claim 12 wherein the phase difference between the first and second carriers recorded in predetermined ones of the adjacent line intervals in adjacent tracks is equal to $\pi$.

14. The method of claim 13 wherein the phase of said first carrier is substantially constant in each successive line interval recorded in one track and the phase of said second carrier is shifted by $\pi$ after each predetermined number of line intervals recorded in said adjacent track.

15. The method of claim 10 wherein the end margin of the area in one track in which a line interval is recorded is aligned, in the direction transverse to the length of said track, with the end margin of the area in the next adjacent track in which another line interval is recorded.

16. A method of reproducing signal information which has been recorded in successive tracks on a record medium, each track containing successive line intervals of recorded frequency modulated video signal components with the phase of the carrier of said frequency modulated video signal component in one line interval differing from the phase of the carrier of the frequency modulated video signal component in an adjacent line interval by an odd multiple of $\pi$, comprising the steps of scanning said successive tracks by a transducer to reproduce the frequency modulated video signal components recorded in the successive line intervals of each track together with a crosstalk frequency modulated video signal component picked up from the adjacent track, the reproduced crosstalk components being out of phase with each other; frequency demodulating the reproduced frequency modulated video signal components to recover the video signal information and a carrier phase shift control component; and removing said carrier phase shift control component from the recovered information.

17. The method of claim 16 wherein the phase of the carrier in the frequency modulated video signal components in alternate line intervals in one track differs from the phase of the carrier in the frequency modulated video signal components in alternate line intervals in the next adjacent track by an odd multiple of $\pi$, said alternate line intervals in both tracks being adjacent each other.

18. The method of claim 16 wherein the phases of the carriers of the frequency modulated video signal components in successive line intervals in a given track differ from each other by an odd multiple of $\pi$.

19. The method of claim 18 wherein the phase of the carrier of the frequency modulated video signal components in successive line intervals in a track next adjacent said given track remains constant.

20. The method of claim 16 wherein said step of removing said carrier phase shift control component from the recovered information comprises generating a local carrier phase shift control component substantially equal to said recovered carrier phase shift control component; and subtracting said local carrier phase shift control component from said recovered information.

21. The method of claim 20 wherein said step of generating a local carrier phase shift control component comprises generating a local carrier; changing the phase of said local carrier in synchronism with the change in phase of the carrier of said reproduced frequency modulated video signal component; producing a DC level; controlling a frequency modulator with said DC level; comparing the phase of the carrier of the frequency modulated signal produced by said frequency modulator with the phase of said local carrier; and varying said DC level in accordance with the phase difference between said carrier and said local carrier.

22. The method of claim 21 wherein a field interval of said video signal component is recorded in each track; and wherein said step of changing the phase of said local carrier comprises controlling said transducer to scan a complete track; detecting the start of a field interval when said transducer first scans the beginning of a track; detecting each line interval in the reproduced video signal components; and changing the phase of said local carrier signal by an odd multiple of $\pi$ for selected ones of said detected line intervals during selected field intervals.

23. The method of claim 16 wherein said video signal component is the luminance component of a composite color television signal having a chrominance component which also is recorded in said successive tracks, said chrominance component in each line interval having been frequency converted to a lower frequency band than the frequency modulated luminance component in said line interval, and further comprising separating the frequency modulated luminance component from the frequency converted chrominance component in the composite color television signal reproduced by said transducer; and frequency reconverting the chrominance component back to an original carrier frequency.

24. The method of claim 23 in which the frequency of the recorded chrominance component and the original carrier frequency of the chrominance component are in frequency interleaving relation to each other.

25. The method of claim 24 wherein the chrominance component is recorded in one track with a first carrier component and in a second adjacent track with a second carrier which has a frequency equal to said first carrier, the first and second tracks alternating across the record medium, and wherein a crosstalk component of the chrominance component recorded in an adjacent track is picked up when a given track is scanned; and wherein the step of frequency reconverting the chrominance component comprises reconverting the chrominance components reproduced from said first track with a first local carrier; reconverting the chrominance components reproduced from said second track with a second local carrier having a frequency equal to said first local carrier; and eliminating the reconverted crosstalk components for each scanned track.

26. The method of claim 25 wherein said reconverted crosstalk components are in frequency interleaving relation with respect to said reconverted chrominance components; and said step of eliminating said reconverted crosstalk components comprises filtering out said crosstalk components from said reconverted chrominance components on the basis of said frequency interleaving relation.

27. Apparatus for recording an information signal component in successive parallel tracks on a record medium, said information signal component occurring in successive first time intervals which are included in repetitive second time intervals, said second time intervals being longer than said first time intervals, said apparatus comprising frequency modulating means for frequency modulating a carrier with said information signal; phase shifting means for selectively shifting the phase of said carrier of said frequency modulated information signal occurring in selected ones of said first time intervals; recording means for recording the frequency modulated information signals in respective areas in said parallel tracks, each said area corresponding to one of said first time intervals, such that the phase of the carrier of said frequency modulated information signals recorded in a predetermined area differs from the phase of the carrier of said frequency modulated information signals recorded in adjacent area by an odd multiple of $\pi$; and means for supplying the frequency modulated information signals to said recording means.

28. The apparatus of claim 27 wherein said phase shifting means includes control means effective to control the phase shift of said carrier in particular first time intervals such that the phase shift between the carrier of the frequency modulated information signals recorded in alternate areas in one track and the carrier of the frequency modulated information signals recorded in alternate areas in the adjacent track is equal to an odd multiple of $\pi$.

29. The apparatus of claim 27 wherein said phase shifting means includes control means effective to control the phase shift of said carrier in particular first time intervals such that the phase shift between the carrier of the frequency modulated information signals recorded in successive areas in a given track is equal to an odd multiple of $\pi$.

30. The apparatus of claim 29 wherein said control means includes means for shifting the phase of said carrier by an odd multiple of $\pi$ in successive first time intervals during a second time interval and for maintaining the phase of said carrier constant throughout successive first time intervals during the next following second time interval.

31. The apparatus of claim 27 wherein said phase shifting means comprises local carrier generating means for generating a local carrier; control means for selectively changing the phase of said local carrier; and phase-lock means for locking the phase of the carrier of said frequency modulated information signal to the phase of said local carrier.

32. The apparatus of claim 31 wherein said local carrier is of a predetermined frequency substantially equal to the frequency of the carrier of said frequency modulated information signal; and said phase-lock means comprises means for extracting said carrier from said frequency modulated information signal, comparison means for comparing the phases of said local carrier and the extracted carrier, and means for varying the phase of said carrier in accordance with the phase comparison.

33. The apparatus of claim 32 wherein said phase-lock means further comprises control signal generating means for generating a control signal proportional to the difference in phase between said local carrier and the extracted carrier; means for adding said control signal to said information signal component; and means for supplying said added control signal and information signal component to said frequency modulating means, whereby said control signal varies the phase of the carrier of said frequency modulated information signal in a direction to be equal to the phase of said local carrier.

34. The apparatus of claim 27 wherein said information signal component is a video signal containing horizontal and vertical synchronizing signals, said first time intervals are line intervals and said second time intervals are field intervals; and said phase shifting means comprises means for generating a first signal synchronized with said horizontal synchronizing signal, means for generating a second signal synchronized with said vertical synchronizing signal, means for combining said first and second signals, and means for controlling the phase shift of the carrier of said frequency modulated video signal with the combined signal.

35. The apparatus of claim 34 wherein said first signal is a rectangular wave signal having first and second portions each equal in duration to a line interval, and said second signal is a rectangular wave signal having first and second portions each equal in duration to a field interval; and wherein said means for combining comprises a gating circuit for producing said first signal only during the first portion of each second signal.

36. The apparatus of claim 35 wherein said means for controlling the phase shift of the carrier of the frequency modulated video signal comprises control signal generating means for generating first and second control signals; means for adding said control signals to said video signal before said video signal is frequency modulated and means responsive to said gating circuit for causing said control signal generating means to generate said first and second control signals during said first and second portions, respectively, of said first signal.

37. The apparatus of claim 27 wherein said information signal component is the luminance component of a composite color television signal of the type including a chrominance component and horizontal and vertical synchronizing signals, and wherein said first time intervals are line intervals and said second time intervals are field intervals; said apparatus further comprising separating means for separating said luminance and chrominance components and for supplying said luminance component to said frequency modulating means; frequency converting means for frequency converting said chrominance component to a frequency band below the frequency band of the frequency modulated luminance component; combining means for combining the frequency converted chrominance component and the frequency modulated luminance component which has its carrier selectively phase shifted; and means for supplying the combined components to said recording means for recording in the same tracks.

38. The apparatus of claim 37 wherein said frequency converting means comprises means for providing first and second carriers having the same frequency for said chrominance component, carrier selector means for alternatively selecting the first and second carriers for said chrominance component to be recorded in said tracks, and selector control means operative to cause the recording of said chrominance component with the first and second carriers therefor, respectively, in tracks which are next adjacent each other.

39. The apparatus of claim 38 wherein said first and second carriers for the chrominance component have different phase characteristics.

40. The apparatus of claim 39 wherein the phase of said first carrier for the chrominance component is constant during successive line intervals of the video signals being recorded in one of said tracks, and the phase of said second carrier for the chrominance component is reversed after each predetermined number of said line intervals of the video signals being recorded in the next adjacent track to said one track.

41. The apparatus of claim 38 wherein said recording means records successive areas in which the ends of the margins between said successive areas in each of said tracks are aligned, in the direction transverse to the lengths of the tracks, with the adjacent ends of the margins between the successive areas in which said line intervals are recorded in the next adjacent tracks.

42. Apparatus for recording a video signal component in successive parallel tracks on a record medium and for reproducing said video signal component therefrom, said video signal component having signal information occurring in successive line intervals included in field intervals, said apparatus including a recording section comprised of frequency modulating means for frequency modulating a carrier with said video signal component to produce a frequency modulated video signal, phase shifting means for selectively shifting the phase of said carrier of said frequency modulated video signal in selected ones of said line intervals; and recording means for receiving the frequency modulated video signal, after selective phase shifting, for recording the received frequency modulated video signal in respective areas in said parallel tracks, each said area corresponding to a line interval, such that the phase of the carrier of said frequency modulated video signal recorded in a predetermined area differs from the phase of the carrier of said frequency modulated video signal recorded in an adjacent area by an odd multiple of $\pi$; and a reproducing section comprised of reproducing means for reproducing the frequency modulated video signal recorded in said respective areas in said parallel tracks together with crosstalk frequency modulated video signals picked up from respective adjacent tracks; frequency demodulating means for frequency demodulating the reproduced frequency modulated video signal to recover the video signal component together with an additional component due to the phase shifting of said carrier of said frequency modulated video signal; and means for removing said additional component from the recovered video signal component.

43. The apparatus of claim 42 wherein said phase shifting means includes control means effective to control the phase shift of said carrier in particular line intervals such that the phase shift between the carrier of the frequency modulated video signals recorded in alternate areas in one track and the carrier of the frequency modulated video signals recorded in alternate areas in the adjacent track is equal to an odd multiple of $\pi$.

44. The apparatus of claim 42 wherein said phase shifting means includes control means effective to control the phase shift of said carrier in particular line intervals such that the phase shift between the carrier of the frequency modulated video signals recorded in successive areas in a given track is equal to an odd multiple of $\pi$.

45. The apparatus of claim 44 wherein said control means includes means for shifting the phase of said carrier by an odd multiple of $\pi$ in successive line intervals during a field interval and for maintaining the phase of said carrier constant throughout successive line intervals during the next following field interval.

46. The apparatus of claim 42 wherein said phase shifting means comprises local carrier generating means for generating a local carrier; control means for selectively changing the phase of said local carrier; and phase-lock means for locking the phase of said carrier to the phase of said local carrier.

47. The apparatus of claim 46 wherein the frequency of said local carrier is substantially equal to the frequency of said carrier; and said phase-lock means comprises means for extracting said carrier from said frequency modulated video signal, comparison means for comparing the phase of said local carrier with the phase of the extracted carrier, and means for varying the phase of said carrier in accordance with the phase comparison.

48. The apparatus of claim 47 wherein said phase-lock means further comprises control signal generating means for generating a control signal proportional to the output of said comparison means; and means for adding said control signal to said video signal component before said video signal component frequency modulates the carrier, whereby said control signal varies the phase of the carrier of said frequency modulated video signal to be equal to the phase of said local carrier.

49. The apparatus of claim 48 wherein said control means for selectively changing the phase of said local carrier comprises means for generating a first repetitive signal synchronized with said line intervals and having first and second portions each substantially equal in duration to a line interval; means for generating a second repetitive signal synchronized with said field intervals and having first and second portions each substantially equal in duration to a field interval; gating means responsive to said first and second signals for producing a gate signal coincident with said first signal only during first portions of said second signal; means for phase inverting said local carrier; and switch means responsive to said gate signal for applying a selected one of the unshifted local carrier and the phase inverted local carrier to said comparison means during first portions of said gate signal and for applying the other local carrier to said comparison means during other times.

50. The apparatus of claim 42 wherein said phase shifting means in said recording section comprises means for generating a phase shift control signal to be added to said video signal component before said component is frequency modulated, said phase shift control signal being generated during both a recording operation and a reproducing operation; and said means for removing said additional component from the recovered video signal component in said reproducing section comprises subtracting means for subtracting said phase shift control signal from said recovered video signal component.

51. The apparatus of claim 50 wherein said means for generating a phase shift control signal comprises local carrier generator means for generating a local carrier of predetermined frequency; phase shift means for shifting the phase of said carrier in synchronism with the change in phase of said local carrier; means for generating a control level; means for applying said control level to said frequency modulating means to produce a frequency modulated signal corresponding to said control level; comparison means for comparing the phase of said phase shifted local carrier with the phase of said carrier corresponding to said control level; and means coupled to said comparison means for varying said generated control level in accordance with said phase comparison, said control level being applied to said subtracting means.

52. The apparatus of claim 51 wherein said control level is added to said video signal component, before the frequency modulation of said carrier by said video signal component, during a recording operation.

53. The apparatus of claim 51 wherein said phase shift means for shifting the phase of said carrier in synchronism with the change in phase of said local carrier comprises means responsive to said recovered video signal component for producing a first signal synchronized with said line intervals, said first signal having successive first and second portions, each of a duration substantially equal to a line interval; means for sensing when said reproducing means begins the reproduction of a frequency modulated video signal in a track to produce a second signal having first and second portions each of a duration representative of a track length; and means responsive to said first and second signals for shifting the phase of said local carrier by an odd multiple of $\pi$ during a selected portion of said first signal which occurs in a selected portion of said second signal.

54. Apparatus for reproducing an information signal component which has been recorded as a frequency modulated signal in successive tracks on a record medium, said information signal component occurring in successive first time intervals which are recorded in correspondingly successive record areas in each track, the phase of the carrier of the frequency modulated signal in one record area differing from the phase of the carrier of the frequency modulated signal in an adjacent record area by an odd multiple of $\pi$, the apparatus comprising transducer means for scanning said successive tracks to reproduce therefrom the frequency modulated signal recorded in the successive record areas of each track together with a crosstalk frequency modulated video signal component picked up by said transducer means from an adjacent track, the crosstalk components being out of phase with each other; demodulating means for frequency demodulating the reproduced frequency modulated signals to recover the information signal component and an additional component due to the phase shifting of said carrier; and means for eliminating said additional component from said recovered information signal component.

55. The apparatus of claim 54 wherein the phase of the carrier of the frequency modulated signal in alternate record areas in one track differs from the phase of the carrier of the frequency modulated signal in alternate record areas in the next adjacent track by an odd multiple of $\pi$, said alternate record areas in both tracks being adjacent each other.

56. The apparatus of claim 54 wherein the phases of the carrier of the frequency modulated signals in successive record areas in a given track differ from each other by an odd multiple of $\pi$.

57. The apparatus of claim 56 wherein the phase of the carrier of the frequency modulated signals in successive record areas in a track next adjacent said given track remains constant.

58. The apparatus of claim 54 wherein said means for removing said additional component comprises means for generating a cancellation signal, and subtracting means coupled to receive said cancellation signal and said recovered information signal component to subtract said cancellation signal from said information signal component.

59. The apparatus of claim 58 wherein said means for generating a cancellation signal comprises means for generating a local carrier; phase shift means for shifting the phase of said local carrier in synchronism with the change in phase of the carrier of said reproduced frequency modulated signals; frequency modulating means for producing a frequency modulated signal having a carrier whose frequency is substantially equal to the carrier of said reproduced frequency modulated signals; and phase-lock means for locking the phase of the carrier of said produced frequency modulated signal to the phase of said local carrier and for producing a variable control level representing the phase difference between the carrier of said produced frequency modulated signal and said local carrier.

60. The apparatus of claim 59 wherein said phase-lock means comprises phase comparison means for comparing the phases of the carrier of said produced frequency modulated signal and said local carrier; variable control level generating means for generating a control level as a function of the phase comparison; and means for supplying said control level to said frequency modulating means wherein the phase of the carrier of said produced frequency modulated signal is controlled by said control level.

61. The apparatus of claim 59 wherein said phase shift means comprises means for sensing when said transducer means begins to scan a track on said record medium and for generating an alternating first signal in response to the scanning of successive tracks; means for generating an alternating second signal in response to the scanning of successive record areas in each track; and means for changing the phase of said local carrier by an odd multiple of $\pi$ for selected portions of said first and second signals.

62. The apparatus of claim 61 wherein said first and second signals each are formed of alternating half-cycles; and wherein said means for changing the phase of said local carrier comprises phase inversion means for inverting the phase of said local carrier; switch means having a first input supplied with said local carrier, a second input supplied with the phase-inverted local carrier, and an output; and switch control means for supplying said phase-inverted local carrier to said switch means output during alternate half-cycles of said second signal which occurs during alternate half-cycles of said first signal, and for supplying said local carrier to said switch means output during other times.

63. The apparatus of claim 54 wherein said information signal component is the luminance signal of a composite color television signal having a chrominance signal and synchronizing signals, all of which are recorded in said successive tracks, each record area having a line interval recorded therein and each track having a field interval recorded therein, the chrominance signal in each line interval having been frequency converted from an original carrier frequency to a lower frequency band than the frequency modulated luminance signal; said apparatus further comprising separating means for separating the frequency modulated luminance signal from the frequency converted chrominance signal in the composite color television signal reproduced by said transducer; and frequency reconverting means for frequency reconverting the chrominance signal back to its original carrier frequency.

64. The apparatus of claim 63 wherein the original carrier frequency and the converted, lower carrier frequency of the chrominance signal are in frequency interleaving relation to each other and to the frequency of said synchronizing signals.

65. The apparatus of claim 64 wherein the converted, lower carrier frequency $f_c$ is equal to $$f_c = \frac{(2m-1)f_H}{4},$$

in which $f_H$ is the frequency of said synchronizing signals and m is a positive integer.

66. The apparatus of claim 64 in which the frequency converted chrominance signal is recorded in adjacent tracks with different first and second carriers having the same frequency, respectively, and wherein said frequency reconverting means reconverts the carriers of the chrominance signals reproduced from said tracks to a common carrier; and further comprising means for eliminating crosstalk signals in said chrominance signals, picked up from adjacent tracks, on the basis of said different first and second carriers.

67. The apparatus of claim 66 wherein said means for eliminating the crosstalk signals includes a comb filter.

68. The apparatus of claim 66 wherein said first and second carriers with which the chrominance signals are recorded have different phase characteristics.

69. The apparatus of claim 68 wherein the phase of said first carrier for the chrominance signal is constant during successive line intervals of the color television signals recorded in one track, and the phase of the second carrier for the chrominance signal is reversed after each predetermined number of said line intervals of the color television signal recorded in the adjacent tracks.

* * * * *